(12) United States Patent
Richardson et al.

(10) Patent No.: US 7,737,892 B2
(45) Date of Patent: Jun. 15, 2010

(54) TIME DELAY BEAMFORMER AND METHOD OF TIME DELAY BEAMFORMING

(75) Inventors: Peter Graham Richardson, Malvern (GB); Geoffrey Martin Herbert, Malvern (GB)

(73) Assignee: QinetiQ Limited (GB)

( * ) Notice: Subject to any disclaimer, the term of this patent is extended or adjusted under 35 U.S.C. 154(b) by 578 days.

(21) Appl. No.: 10/550,227

(22) PCT Filed: Mar. 19, 2004

(86) PCT No.: PCT/GB2004/001189

§ 371 (c)(1),
(2), (4) Date: Sep. 20, 2005

(87) PCT Pub. No.: WO2004/083885

PCT Pub. Date: Sep. 30, 2004

(65) Prior Publication Data

US 2006/0220956 A1    Oct. 5, 2006

(30) Foreign Application Priority Data

Mar. 21, 2003    (GB) .................................. 0306529.9

(51) Int. Cl.
*H01Q 3/22* (2006.01)
*G01S 1/00* (2006.01)
(52) U.S. Cl. .................................. 342/375; 342/357.12
(58) Field of Classification Search ............ 342/357.12, 342/375; 706/24
See application file for complete search history.

(56) References Cited

U.S. PATENT DOCUMENTS 4,544,927 A    10/1985   Kurth et al.
4,688,045 A *   8/1987   Knudsen .................. 342/377
5,084,708 A *   1/1992   Champeau et al. .......... 342/377
5,383,164 A     1/1995   Sejnowski et al.
6,380,908 B1 *  4/2002   Andrews et al. ............ 343/853
6,738,018 B2 *  5/2004   Phelan et al. .............. 342/373
6,801,161 B2 * 10/2004   Lehtomaki et al. .......... 342/377
7,187,907 B2 *  3/2007   Widrow ...................... 455/73
2002/0122002 A1* 9/2002  Maalouf et al. .......... 342/357.12
2003/0122710 A1* 7/2003  Lehtomaki et al. .......... 342/377

(Continued)

FOREIGN PATENT DOCUMENTS

GB    2 329 072    10/1999

OTHER PUBLICATIONS

Michael A. Zatman, Oct. 26, 2003, Fifth Annual ASAP 97 Workshop.*

(Continued)

*Primary Examiner*—Thomas H Tarcza
*Assistant Examiner*—Harry Liu
(74) *Attorney, Agent, or Firm*—McDonnell Boehnen Hulbert & Berghoff LLP (57) ABSTRACT

A time delay beamformer comprises input channels, which have associated samplers arranged to sample inputs signal carried upon the input channels. The samplers sample the input channels at a number of points in time to produce a number of sampled signals. An adaptive processor receives each of the input signals and each of the sampled signals, and generates processed signals therefrom. Time delay devices introduce a steering time delay to the processed signals and a summer generates a beamformed output signal the delayed processed signals.

30 Claims, 3 Drawing Sheets

U.S. PATENT DOCUMENTS

2004/0102157 A1* 5/2004 Lewis .................... 455/63.4
2005/0195103 A1* 9/2005 Davis et al. ................ 342/99

OTHER PUBLICATIONS

Klemm, "Prospectives in stap research" 2000 IEEE, pp. 7-11.

Zatman et al., "Time delay steering architectuers for space-time adaptive processing", 1997, IEEE, pp. 2426-2429.

* cited by examiner

TIME DELAY BEAMFORMER AND METHOD OF TIME DELAY BEAMFORMING

This invention relates to a time delay beamformer and a method of time delay beamforming. More particularly, but not exclusively, it relates to a time delay beamformer and a method of time delay beamforming that incorporate adaptive weighting.

Adaptively beamformed phased array radar typically have a narrow bandwidth, and consequently a small fractional bandwidth, $$\frac{B}{f_o}$$

where B=bandwidth, $f_o$=central frequency. This allows the use of adaptive beamforming in which beamforming weights are generated dependent upon received returns and are typically calculated to minimise the output power of a beamformer, subject to constraints such as maintaining a high signal gain in a desired direction. The small fractional bandwidth allows beam steering via the application of phase delays at the array elements.

However, in wide bandwidth systems, for example where high resolution is required for, for example for air-to-air, or air-to-ground target identification, and non-co-operative target identification phase delay beamforming cannot be used as it causes beam squint, whereby the direction of the beam varies with frequency. Typical radar frequencies can be from tens or hundreds of MHz to a few hundreds of GHz.

In cases where simultaneous adaptation is required in the angle and frequency domains, it is known to apply space-time adaptive processing (STAP) digital filtering in which each input channel is sampled at a number of time intervals. When the input channels are sampled at a periodicity approaching the pulse repetition interval, so called "slow time" adaptation, adaptation occurs in the angle-Doppler frequency domain. This results in adaptation of a received return in both Doppler frequency and space: that is the adaptation is dependent upon the relative velocity of the system to a target, and also upon the angle of arrival of the return. This is useful in ground moving target indication (GMTI) where, due to Doppler shifts, ground clutter will exhibit a different return to a moving target. When the input channels are sampled at a period near the reciprocal of the signal bandwidth, so called "fast time" adaptation, adaptation occurs in the angle—instantaneous frequency domain. This is required in wide bandwidth systems, where the difference between the lowest and the highest frequency is, for example, 10% of the central frequency.

In wideband systems, beam steering must be performed using time delays rather than phase delays. In a conventional time delay adaptive beamformer it is usual to digitally sample received returns using in each spatial channel following analogue time delays for beam steering. One problem associated with such an arrangement is that in multiple element arrays the computational power necessary to calculate adaptive beamforming weights that provide interference cancellation varies as $Pn^3$, where n is the number of array elements present and P is the number of adaptive beams. Thus, this procedure can be very computationally intensive for a typical array having of the order of hundreds or thousands of array elements, forming a large number of adaptive beams. Attempts have been made to circumvent these difficulties by using a complicated set of constraints in the adaptive weight calculation. The constraints act to replicate the beam steering time delays in wideband multiple beam systems. However, the approach is not completely effective and increasing the number of constraints further increases the computational load.

Additionally, the application of time delay beam steering before interference cancellation (instead of phase delay beam steering) can destroy a linear relationship between the angular location of scatterers and the Doppler shift of returns from the scatterers in slow time STAP radar. This results in a degradation of clutter suppression and slow moving target detection.

According to a first aspect of the present invention there is provided a time delay beamformer comprising a plurality of input channels, each channel having associated sampling means arranged to sample an input signal carried upon the input channel at a plurality of points in time to produce a plurality of sampled signals; adaptive processing means arranged to receive signals indicative of each of the input signals and each of the plurality of sampled signals, and arranged to generate processed signals therefrom; time delay means arranged to introduce a steering time delay to a signal indicative of the said processed signals to produce delayed signals; and summation means arranged to generate a beamformed output signal from signals indicative of the said delayed signals.

The invention may be considered to be a post-adaptive time delay beamformer and methods of post-adaptive time delay beamforming.

Such a beamformer has an advantage over prior art systems of being applicable to wide bandwidth systems to remove beam squint whilst not degrading clutter suppression and slow moving target detection, particularly in airborne systems. This is because with the application of time delay beam steering after adaptive processing (instead of before), the linear relationship between the angular location of a return and the Doppler shift of the return is preserved whilst allowing space time adaptive processing (STAP) to be carried out for interference rejection. Additionally, this beamforming arrangement removes the necessity to recalculate a covariance matrix for each beam steer direction, thereby reducing the computational load associated with adaptive processing over prior art arrangements. This is useful especially, but not exclusively, in multiple beam configurations. The arrangement also allows flexibility in the application of further adaptive operations relating to time delayed channels rather than conventional beamforming operations.

Preferably there are a plurality of procured signals produced by said adaptive processing means, preferably as many processed signals as there are input signals. Preferably a plurality of delayed signals are produced from the plurality of processed signals, preferably as many delayed signals as there are processed signals. The summation means preferably sums a plurality of, and preferably all of, the delayed signals to generate a beamformed output signal.

The beamformer is preferably configured to evaluate or emit multiple beams simultaneously (or substantially simultaneously).

The beamformer may comprise at least one, or a plurality of analogue to digital converters (ADCs), each ADC being arranged to digitise a respective input channel. Instead of having one ADC for each channel a number of channels may share a common ADC, for example by multiplying. There may be only one ADC, or there may be more than one.

The adaptive processing means may be arranged to generate an input data covariance matrix from the input channels and the sampled signals. The processing means may be arranged to apply steering vectors to at least some entries, and preferably to each, entry in a matrix derived from the covariance matrix, typically the inverse of the covariance matrix, or vice versa. The processing means may be arranged to generate at least one steering time delay, which may be passed to the time delay means.

There may be n input channels, typically of the order of 30-40, possibly more than 40, or of the order of more than 100 or 1,000 input channels. Each input channel may have m time delayed taps. Each time delay tap may be arranged to be spaced by a time that is approximately equal to the pulse repetition interval of a transmitted, pulsed signal. Alternatively, each time delay tap may be arranged to be spaced by a time that is approximately equal to the reciprocal of the bandwidth of a transmitted signal. It will be appreciated that the beamformer may include both "fast-time" and "slow-time" architectures, possibly in combination. The covariance matrix may be an nm×nm dimensional matrix. There may be n, or less than n, time delay means arranged to generate n, or less, steered beam directions.

There may be provided a summation unit arranged to sum the time delayed signals and generate a combined, preferably single, output therefrom.

According to a second aspect of the present invention there is provided a method of time delay beamforming comprising the steps of:
  i) tapping input signals of a plurality of detected signal inputs at regular time intervals to produce a plurality of time delayed sampled signals;
  ii) processing input signals, or signals indicative of the input signal(s) and the time delayed sampled signals, or signals indicative of the sampled signals, to reject unwanted signal components therefrom, to produce processed signals, or at least one processed signal;
  iii) applying asteering time delay(s) to the processed signal(s), or a signal indicative of the processed signal(s), to produce at least one delayed signal; and
  iv) generating a beamformed output from the delayed signa(s) or a signal indicative of the delayed signal(s).

The method may include digitising respective input channels.

The method may include generating a covariance matrix from the input channels and the sampled signals. The method may include applying steering vectors to each entry in the inverse of the covariance matrix. The method may include generating at least one steering time delay, and may include passing a generated delay signal to the time delay means. The method may include generating an nm×nm dimensional covariance matrix where n is the number of input channels and m is the number of taps per spatial channel. The method may include generating n, or less, steered beam directions, typically using the nm, or less than nm, time delay means. The method may include spacing each time delay tap by a time that is approximately equal to a pulse repetition interval of a transmitted, pulsed signal, known as "slow time" adaptation. Alternatively, the method may include spacing each time delay tap by a time that is approximately equal to the reciprocal of a transmitted signal bandwidth, known as "fast time" adaptation.

The method may include summing the time delayed signals and generating a single output therefrom.

According to a third aspect of the present invention there is provided a method of reducing the computational load associated with beamforming comprising the steps of:
  i) generating an estimated covariance matrix from a plurality of time delay tapped input channels;
  ii)
  ii) forming an adaptive weight vector for at least one space-time channel from a column of the inverse of the covariance matrix;
  iii) applying the adaptive weight vector to the space-time channel to form an interference cancelled spatial channel; and
  iv) applying a time delay to each spatial channel.

The method may include summing a plurality of delayed signals derived from a plurality of output channel signals to form a beamformed output.

According to a fourth aspect of the present invention there is provided a method of increasing the resolution of a sideways sensing sensor array comprising the steps of:
  i) receiving a plurality of input channel signals;
  ii) tapping a plurality of time delayed, tapped, sampled signals from each of the input channels; and
  iii) applying space time adaptive processing to the plurality of input channel signals and sampled signals so preserve the linear relationship between Doppler frequency and angle of return.

It will be appreciated that the term "sideways sensing" is applied to a sensor array where the field of view of the sensor array is not substantially co-linear with the direction of travel of a platform upon which the sensor array is mounted (or the relative direction of travel between the array and the target being sensed—the array may be stationary).

According to a fifth aspect of the present invention there is provided a radar or sonar or telecommunications device, comprising a time delay beamformer according to the first aspect of the present invention, or using any one of the methods of the second, third, or fourth aspects of the invention.

The invention can be considered, in one aspect, to revolve around when in the sequence of signal processing time delay steering is applied (after processing signals from receiver channels, instead of before processing to remove unwanted signal).

Alternatively, the invention in another aspect can be thought of as having a plurality of receiver channel signals each weighted to remove unwanted components in the signal channels, and then applying a beamsteering modification to the signals before combining them to form a directional beam.

In STAP it is usual to apply one complex weight to each of the NM channels and then sum the resulting outputs to produce a single beamformed channel. Beamsteering is usually performed by pre-applying phase weights or time delays at each of the N spatial channels. Advantages of the new processing configuration accrue from the fact that it allows the application of time delay steering after the adaptive rejection of interference (clutter plus jamming) has been performed. We use an application of a set of adaptive weights for each modified channel, any number of beams can be produced from this modified channel by applying appropriate time delays. The beamsteering is then achieved by application of the required time delays to each of the adaptively processed channels. The time delay steered channels are combined to form a single beamformed output.

The invention will now be described, by way of example only, with reference to the accompanying drawings, in which.

Figure 1:
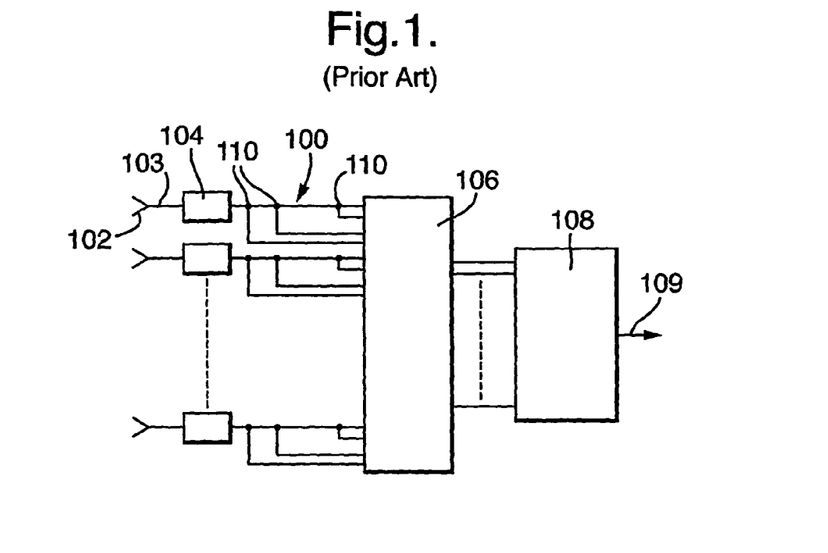
FIG. 1 is a schematic representation of an embodiment of a time delay beamformer of the prior art.

Referring now to FIG. 1, a prior art phased array time delay beamformer 100 of a wideband high range resolution radar system comprises a plurality of array elements 102 each of which is connected to a spatial input channel 103, there being n such input channels; time delay devices 104 for each input channel, typically a digital filter, an analogue delay line or a photonic device, a space time adaptive (STAP) processor 106 and a beamformer summation unit 108, which may be either a conventional or an adaptive beamformer summation unit.

A wideband radar return is received at the array elements 102 and is passed down the respective spatial input channels 103. The time delay devices 104 introduce a steering time delay to the return in order to steer the radar's field of view and produce a steered signal. This may involve the generation of multiple directional beams or a single directional beam. The time delay steering manipulation of the input signals is performed before temporally separated taps 110 are taken. Each of the input channels 103 has m delay taps 110, typically spaced apart by a time approximately equal to the pulse repetition interval of pulses transmitted by the radar system or by the order of the reciprocal of the transmitted signal bandwidth. Each of the taps 110 samples the steered signal and feeds these samples into the STAP processor 106 along with the steered signal.

The STAP processor 106 carries out interference rejection and nulling using any one of a number of techniques. One suitable technique is to use a sample matrix inversion (SMI) algorithm in which an (nm×nm) covariance matrix of the nm, input signals is estimated and inverted in order to calculate complex weights to be applied to each of the input channels 103. Each of the n channels is output to the beamformer summation unit 108 following interference rejection and nulling where they are summed to provide a single beamformed output 109.

Figure 2:
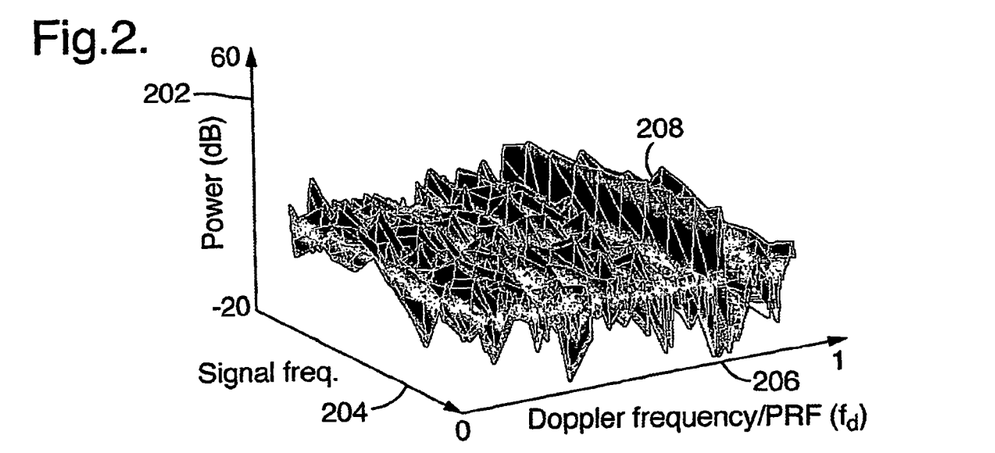
FIG. 2 is a simulation of a 32 element sideways looking linear array having an instantaneous fractional bandwidth of 10% using phase steering.

Referring now to FIG. 2, a three-dimensional plot of power 202 as a function of both signal frequency 204 and Doppler frequency 206 is shown for a simulation of a 32 element sideways looking array, in an airborne scenario where the radial velocity of a target is such that it lies within the Doppler bandwidth of mainlobe clutter, i.e. a slow moving target. The instantaneous fractional bandwidth of the modelled radar receiver is 10% and can therefore be considered wideband.

A target return 208 is evident above the residual clutter, after adaptive processing, with a power of approximately 10 dB using conventional phase steering. However, conventional phase steering introduces beam squint for large bandwidth systems, and should beam squint exceed the 3 dB level, i.e. one beam width, beamwidth accuracy is lost.

Figure 3:
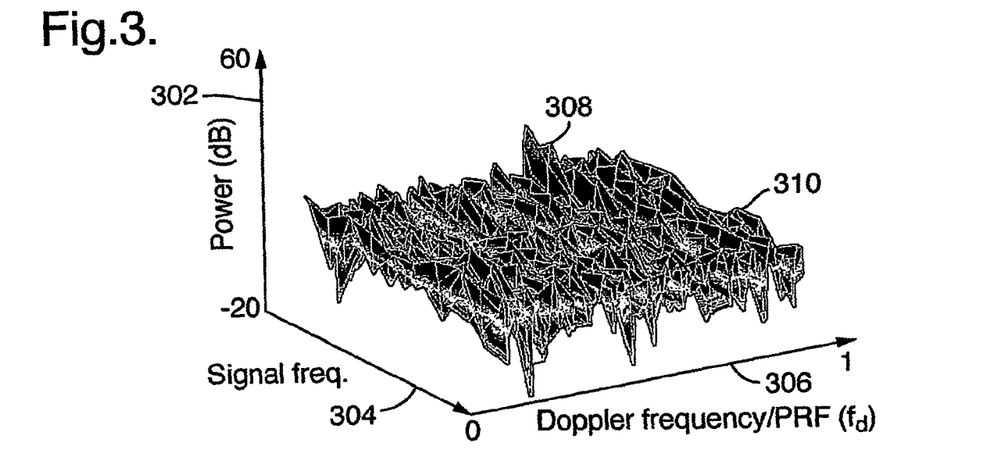
FIG. 3 is a simulation of the array simulated in FIG. 2 using conventional time delay steering.

Referring now to FIG. 3, this shows a three-dimensional plot of power 302 as a function of both signal frequency 304 and Doppler frequency 306. This is shown for a simulation of a 32 element sideways looking array, in an airborne scenario where the radial velocity of a target is such that it lies within the Doppler bandwidth of mainlobe clutter, i.e. a slow moving target, using a conventional time delay beamforming apparatus as shown in relation to FIG. 1. The instantaneous fractional bandwidth of the modelled radar receiver is 10% and the radar can therefore be considered wideband.

A target return 308 lies just above the level of clutter induced noise 310. This illustrates the prior art effect of applying time delay beam steering to a wideband radar prior to STAP processing in order to eliminate beam squint in that the linear relationship between the angular location of returns and their Doppler frequency breaks down and clutter returns are broadened. This results in poor clutter suppression and the degradation of slow moving target detection.

Figure 4:
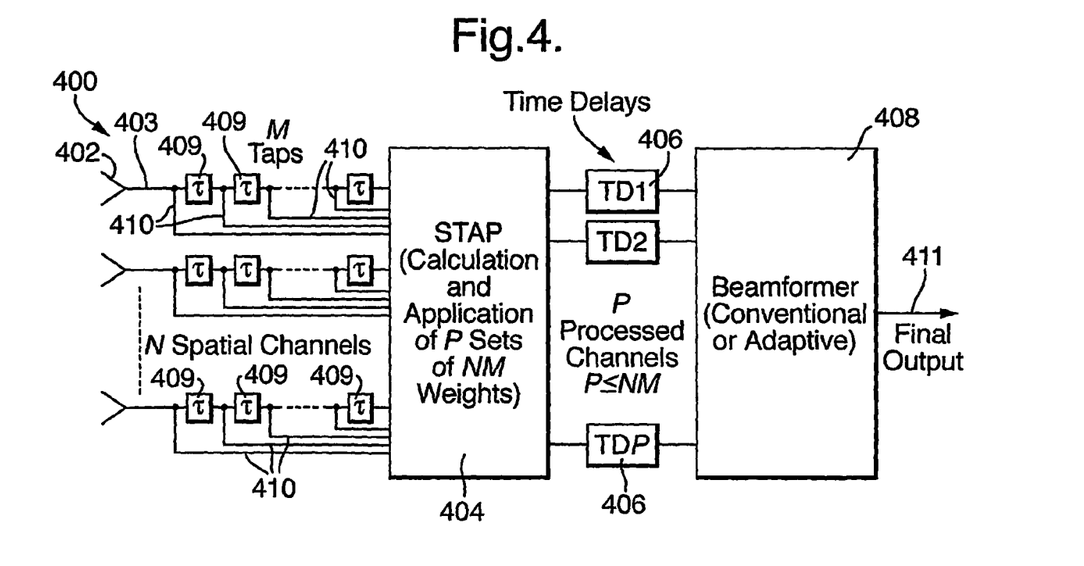
FIG. 4 is a schematic representation of an embodiment of a time delay beamformer according to an aspect of the present invention.

Referring now to FIG. 4, an embodiment of time delay beamformer 400 of a wideband radar system, according to an aspect of the present invention, comprises a plurality of array elements 402 each of which is connected to a spatial input channel 403, there being n such input channels, a space time adaptive (STAP) processor 404, time delay devices 406, typically digital filters, and a beamformer summation unit 408, which may be either a conventional or an adaptive beamformer summation unit. A beam steering time delay is applied by the devices 406 after the processor 404 has adaptively removed unwanted signals in the input channel signals (i.e. time delay post adaptive processing).

A wideband radar return is received at the array elements 402 and is passed down the respective spatial input channels 403. Each of the input channels 403 has m delay taps 410 spaced apart by a tap delay, r, referenced 409, typically a time approximately equal to the pulse repetition interval of pulses transmitted by the radar system or the order of the reciprocal of the transmitted signal bandwidth. The tap delays 409 are in this example all equal to each other, but they do not need to be. So as to produce nm space-time channels. Each of the taps 410 samples the received signal and feeds these samples into the STAP processor 404. The STAP processor 404 carries out interference rejection and nulling using any one of a number of techniques, for example, sample matrix inversion (SMI) algorithm in which a covariance matrix of an (nm×nm) covariance matrix of input signals is estimated and inverted in order to calculate a single complex set of weights to be applied to each of the input channels 403.

The STAP processor 404 is capable of generating less than or up to nm nulled and interference suppressed, processed, output channels by the generation of nm sets of complex adaptive weights, typically the STAP processor will be used to generate n or less output channels.

A single STAP weight vector, calculated by the SMI algorithm, that maximises the signal to noise ratio of the combined beamformed output, referenced 411 in FIG. 4, of beamformer 400 is given by:

$$w = c\hat{R}^{-1}z \quad (1)$$

Where:
$\hat{R}$ is the estimated covariance matrix;
Z is the signal steering vector; and
c is an arbitrary constant Thus the beamformed output at time t is given by:

$$y(t) = w^H x(t) \quad (2)$$

Where:
x(t) is the NM dimensional vector of channel input at time t; and
H is the Hermitian transpose operator Substituting the SMI algorithm calculated weights from equation (1) into equation (2) allows y(t) to be expressed as a sum of nm adaptively processed outputs:

$$y(t) = c \sum_{k=1}^{nm} z_k^* y_k(t) \quad (3)$$

Where:

$z_k$ is the $k^{th}$ element of the vector z; and $$y_k(t) = r_k^H x(t); \quad (4)$$

Where:

$r_k$ is an intermediate weight vector, i.e. the $k^{th}$ column of the inverse of the covariance matrix.

The vectors $r_k$ in equation (4) are effectively adaptive weight vectors which cancel the interference in the $k^{th}$ channel using a linear combination of the other channels. The $k^{th}$ column of the inverse of the covariance matrix is effectively a set of adaptive filter weights for the nm channels, including the $k^{th}$ channel, which can be used to produce a modified $k^{th}$ channel with any interference adaptively suppressed.

Each one of the channels described by Equation (4) corresponds to a modified form of a respective one of the nm space-time channels. The application of phase shift to the outputs of the STAP processor (404) is equivalent to carrying out beamforming using the complex weight vector z.

The time delay devices (406) introduce a steering time delay to the return in order to steer the radar's field of view and produce a steered signal. The use of time delays in beam steering effectively applies a frequency dependent phase shift to the elements of z and therefore the beam steer direction is independent of frequency, thus wideband operation is supported.

Assuming ideal time delays are used, and the outputs are weighted and summed without further complex, computationally intensive, processing, the overall output of the beamformer (400) is given by:

$$y(t) = c \sum_{k=1}^{nm} |Z_k| \cdot y_k(t - \tau_k) \quad (5)$$

Where:

$\tau_k$ is the required beam steering time delay for channel k.

Typically the required beam steering time delay for each channel will not be an integer number of sampling intervals and interpolating filters may be used in order to estimate channel output values at the require beam steering delays.

Where the Doppler frequency of a target is not known a modified signal steering vector is used that utilises only information relating to the desired signal angle of arrival. Such a modified signal steering vector is given by:

$$z = [z_s^T, 0^T, 0^T, \ldots 0^T]^T \quad (6)$$

Where:

$z_s$ is the N by 1 spatial steering vector for the desired signal 0 is the N by 1 zero vector; and T is the transpose operator This form of z is often referred to a clamped column constraint vector as it fixes the spatial response of the space-time processor at the first column of delay taps 410. The clamped column constraint leads to only n STAP processor 404 outputs. Thus, the application of the time delay devices 406 and the beamformer summation unit 408 to the n STAP processor 404 outputs results in the spatial beamforming of n interference cancelled channels.

Following application of the beam steering time delay at the time delay devices 406 the channels pass to the beamformer summation unit 408 where they are summed to provide a single beamformed output.

Whilst described with reference to the application of adaptive complex weights in the STAP processing step it will be appreciated that pre-determined fixed weights can be used, for example in clutter rejection based upon displaced phase centre antenna (DPCA) processing. The invention is not restricted to adaptive weights and adaptive processing—it also covers fixed weights, non-adaptive signal processing.

Figure 5:
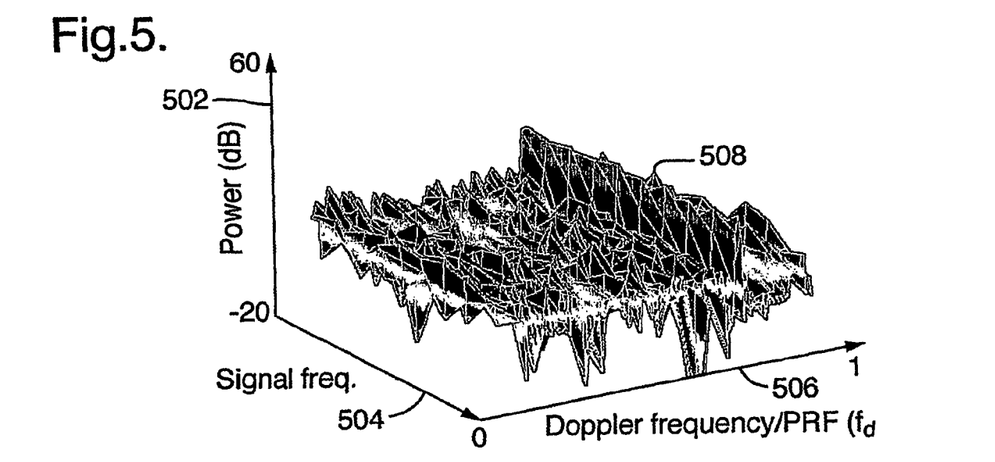
FIG. 5 is a simulation of the array of FIG. 2 incorporating the beamformer of FIG. 4.

Referring now to FIG. 5, a three-dimensional plot of power 502 as a function of both signal frequency 504 and Doppler frequency 506 is shown for a simulation of a 32 element sideways looking array, in an airborne scenario where the radial velocity of a target is such that it lies within the Doppler bandwidth of mainlobe clutter using phase steering, i.e. a slow moving target. The instantaneous fractional bandwidth of the modelled radar receiver is 10% and can therefore be considered wideband.

A target return 508 is evident above the background clutter with a power of approximately 25 dB using a time delay steering beamformer 400 as described hereinbefore with reference to FIG. 4.

The target return 508 is approximately 15 dB stronger than that for the phase steering case of FIG. 2, also the use of time delay steering removes beam squint in sideways looking systems that is associated with phase delay steering.

When compared to the conventional time delay beam steering case the beamformer architecture of the FIG. 4 generates a much stronger target return 508 as can be seen by a comparison of FIG. 3 to FIG. 5. The target return 308 of the conventional time delay steering case is almost lost in the clutter returns 310 whereas the return associated with the beamformer architecture of the FIG. 4 has a return strength of approximately 25 dB.

Figure 6:
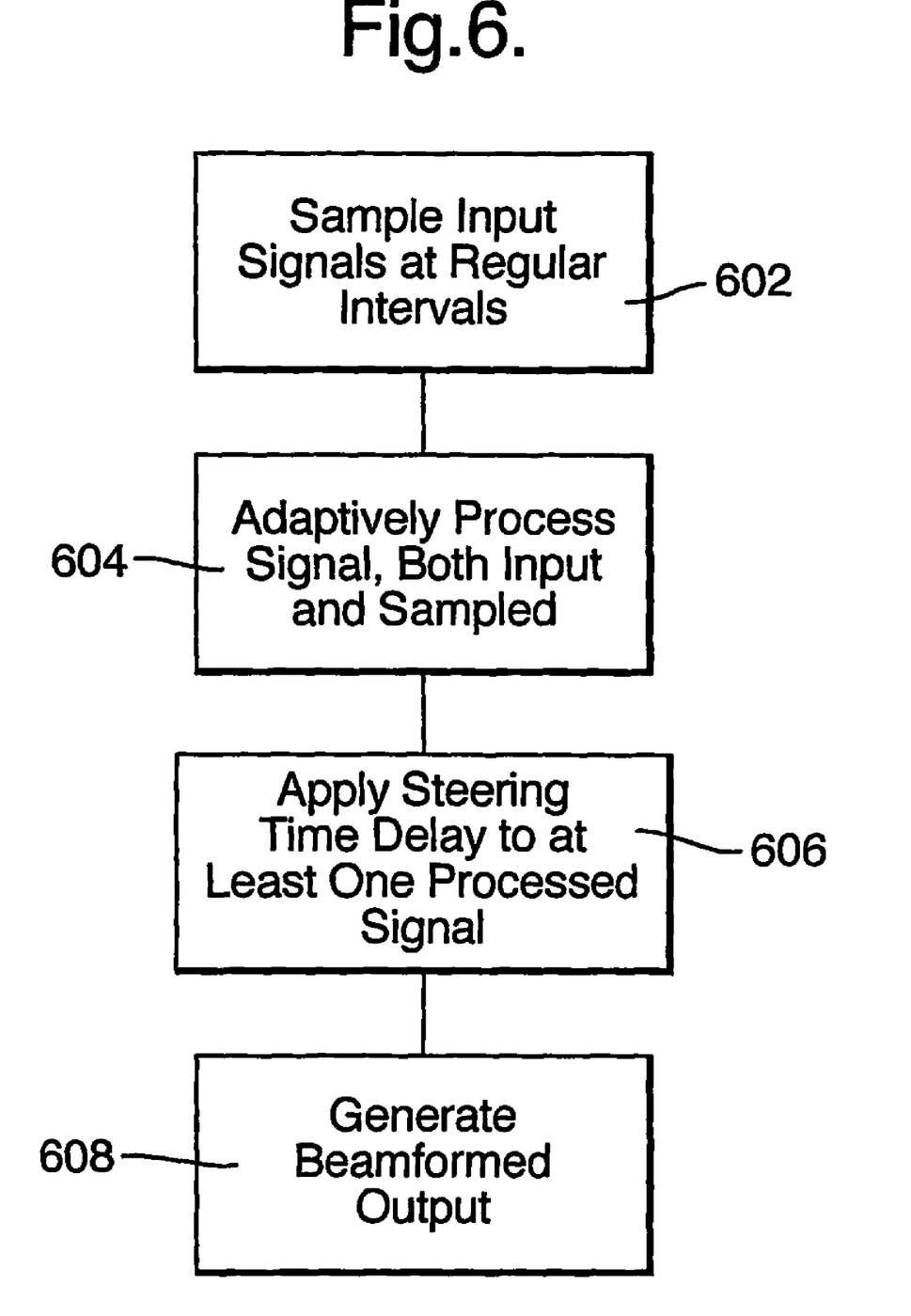
FIG. 6 is a flow diagram of a method of time delay beamforming according to an aspect of the present invention.

Referring now to FIG. 6, a method of time delay beamforming comprises sampling an input signal at regular time intervals (Step 602). The input signal and the sampled signals are adaptively processed to reject unwanted signal components therefrom to form at least one processed signal (Step 604). A steering time delay is applied to at least one processed signal to produce at least one delayed signal (Step 606). A beamformed output is generated from the at least one delayed signal (Step 608).

It will be appreciated that although discussed in terms of emitting a beam, the invention, and the embodiments can be used to detect a signal from a given direction, and that by "beamformer" and "beamforming" is meant both the generation of a beam in a given direction and alternatively the detection of incident waves from a given direction. The waves could be electromagnetic, such as radio waves, or vibrational, such as sonar.

Applying phase shifts to the STAP outputs rather than time delays in equation (5) would be mathematically equivalent to carrying out the final beamforming operation using the complex weight vector z (as represented by equation (3)). The use of time delays is analogous to applying frequency-dependent phase shifts to the elements of z. The appropriate value for each time delay, $\tau_k$, is that which is equivalent to the required phase shift for $z_k$ at the central frequency. The use of time delays rather than phase shifts ensures that the beam steer direction (in angle and Doppler) is independent of the signal frequency. In general, the $\tau_k$ values will not be equal to an integer number of sampling intervals and it may be necessary to use interpolating filters to estimate the channel output values at the required delays.

A benefit of the proposed architecture is that it negates the need to re-calculate and invert the covariance matrix $\hat{R}$ for each beam steer direction in wideband multiple beamforming applications. This considerably reduces the computational load associated with the adaptive processing. It should also be noted that the new architecture offers the flexibility for applying further adaptive processing on the time delayed channels instead of the final conventional beamforming operation described in equation (5). There is also the option of using pre-determined fixed weights, rather than adaptive weights, in the initial space-time processing stage (an example would be weights for clutter rejection based upon displaced phase centre antenna (DPCA) processing).

Another advantage stems from using another aspect of the invention (but it may not be the only advantage of the other aspect of the invention). STAP is a well-known technique for suppression of narrow-band clutter. It involves simultaneous adaptation in spatial frequency (angular location) and Doppler frequency. STAP is effective if the region of angle-Doppler space covered by the clutter is limited and separate from desired targets. In the case of a sideways-looking linear array, there is a well-known linear relationship between the angular location of the ground scatterers from which the clutter returns are received and the Doppler shift of these returns. If phase-delay steering is applied then this linear relationship still holds even when the waveform is wideband. However, if time delay steering is applied so as to eliminate beam squint, then the linear relationship is destroyed and the line in angle-Doppler space representing the clutter is broadened, resulting in poorer clutter suppression and degradation of the slow moving target detection performance. We may therefore prefer phase-delay for wideband sideways-looking arrays.

Although described in the context of radar, the invention can also be used in other beamforming situations, for example in sonar (e.g. towed array sonar, where for example, the array can have hundreds, or more, channels and be hundreds of metres or more, in length), and in telecommunications situations (e.g. general telecommunications such as wireless networks, mobile telephones, etc.).

It will be appreciated that "beamforming" is used to cover both forming an outgoing beam from the array and turning the array to detect incoming propagated signals from a selected "beam" direction: it covers both emit and receive.

The reduction in computational load on a beamforming processor will be more pronounced in multiple beam systems: where the apparatus looks simultaneously (or nearly so) in a number of different directions. In such systems there are of course more calculations for the processor to perform per second. Multiple beam systems may detect from (or emit to) 2 or more directions, 5 or more, 10 or more, 20 or more, 30 or more, 50 or more, or in a number of directions in a range defined by any of the above.

The invention claimed is:

1. A time delay beamformer comprising a plurality of input channels, each channel having associated sampler arranged to sample an input signal carried upon the input channel at a plurality of points in time to produce a plurality of sampled signals; a processor arranged to receive said input signals and said sampled signals, or signals indicative of each of the input signals and each of the plurality of sampled signals, and arranged to generate space-time processed signals therefrom; a steering time delay arranged to introduce a steering time delay to said processed signals, or to signals indicative of said processed signals to produce at least two delayed signals and a summer arranged to generate a beamformed output signal from the delayed signals, or from signals derived from the delayed signals.

2. A beamformer according to claim 1 wherein the processing means is arranged to output a plurality of processed signals, and the time delay means is adapted to apply a time delay on a plurality of processed signals to form a plurality of time delayed signals, and the summation means is adapted to generate a beamformed output signal from said plurality of time delayed signals.

3. A beamformer according to claim 2 wherein there are substantially as many processed signals produced by the processor as there are input signals.

4. A beamformer according to claim 2 wherein there are substantially as many time delayed signals as processed signals.

5. A beamformer according to claim 1 wherein the adaptive processing means is arranged to generate an input data covariance matrix from the input channels and the sampled signals.

6. A beamformer according to claim 5 wherein the processing means is arranged to apply steering vectors to each entry in a matrix derived from the covariance matrix, or vice versa.

7. A beamformer according to claim 1 wherein the processing means is arranged to generate steering time delays, or at least one steering time delay, which is/are passed to the time delay means.

8. A beamformer according to claim 1 wherein each time delay means is spaced by a time that is approximately equal to the pulse repetition interval of a transmitted, pulsed signal.

9. A beamformer according to claim 1 in which the time delay means comprise time delay taps derived from input channels.

10. A beamformer according to claim 1 comprising n input channels, each input channel having m time delayed means.

11. A beamformer according to claim 10 comprising nm, or less than nm, time delay means arranged to generate nm, or less, steered beam directions.

12. A beamformer according to claim 1 wherein the channels comprise a plurality of signal sensors adapted to detect an incident wave and signal transmit lines adapted to transmit channel signals from the sensors to the processing means, the time delay means comprising tapped lines taking tapped signals from different places along the lengths of the signal transmit lines such that the processing means receives tapped, time delayed signals from the tapped lines, as well as the channel signals from the signal transmit lines, the arrangement being such that the time delays of the tapped signals are fixed for each tapped signal.

13. A beamformer according to claim 1 wherein the steering time delays applied by the steering time delay means to a particular input channel are variable depending upon the signals received by the other input channels.

14. A beamformer according to claim 1 wherein the processing means is programmed to apply adaptive weights to the signals of the input channels, the weighting applied to the signal of specific input channels being dependent upon the signals received from other input channels.

15. A method of time delay beamforming in a beamformer according to claim 1, the method comprising the steps of:
  i) tapping input signals of a plurality of detected signal inputs at regular time intervals to produce a plurality of time delayed sampled signals;
  ii) processing input signals, or signals indicative of the input signal(s), and the time delayed sampled signals, or signals indicative of the sampled signals, using a space-time processor to reject unwanted signal components therefrom, to produce a plurality of space-time processed signals;
  iii) applying a steering time delays to the space-time processed signal(s), or signal(s) indicative of the space-time processed signal(s) to produce a plurality of delayed signals; and iv) generating a beamformed output from the delayed signals, or from a signal indicative of the delayed signals.

16. A method of reducing the computational load associated with beamforming in a beamformer according to claim 1, the method comprising the steps of:
   i) generating an estimated covariance matrix from a plurality of time delay tapped input channels;
   ii) forming an adaptive weight vector for a space-time channel from a column of the inverse of the covariance matrix;
   iii) applying the adaptive weight vector to the space-time channel to form an interference cancelled spatial channel; and
   iv) applying a time delay to the spatial channel.

17. The method of claim 16 including summing the delayed at least one output channel signal to form a beamformed output.

18. A method of increasing the resolution of a sideways sensing sensor array using at least one beamformers of claim 1 comprising the steps of:
   i) receiving a plurality of input channel signals;
   ii) tapping a plurality of time delayed, tapped, sampled signals from each of the input channels; and
   iii) applying space time adaptive processing to the plurality of input channel signals and sampled signals so preserve the linear relationship between Doppler frequency and angle of return.

19. A radar, or sonar, or telecommunications device comprising a time delay beamformer according to claim 1.

20. A beamformer of claim 1 configured for beamforming from a plurality of beam directions simultaneously or substantially simultaneously.

21. The method of claim 15 including generating a covariance matrix from the input channels and the sampled signals.

22. The method of claim 21 including generating an nm×nm dimensional covariance matrix where n is the number of input channels and m is a number of taps.

23. The method of claim 22 including generating nm, or less, steered beam directions, using nm, or less than nm, time delay means.

24. The method of claim 21 including applying steering vectors to each entry in the covariance matrix.

25. The method of claim 15 including generating steering time delays, or at least one steering time delay, and passing the steering time delays to time delay means and delaying processed signals produced by the processor by the steering time delays.

26. The method of claim 15 comprising tapping the input signals at times that are spaced by approximately the pulse repetition interval of a transmitted, pulsed signal that is being detected by the beamformer.

27. The method of claim 15 wherein the input signals are adaptively weighted to produce the processed signals.

28. The method of claim 15 wherein a plurality of beam directions are produced simultaneously or substantially simultaneously.

29. The method of claim 28 comprising beamforming from at least 5 directions simultaneously or substantially simultaneously.

30. A radar, or sonar, or telecommunications device adapted to use the method of claim 15.

* * * * *